July 3, 1956
C. SAGONA
2,752,688
MULTI-PURPOSE HEIGHT GAGES
Filed May 7, 1953
2 Sheets-Sheet 1
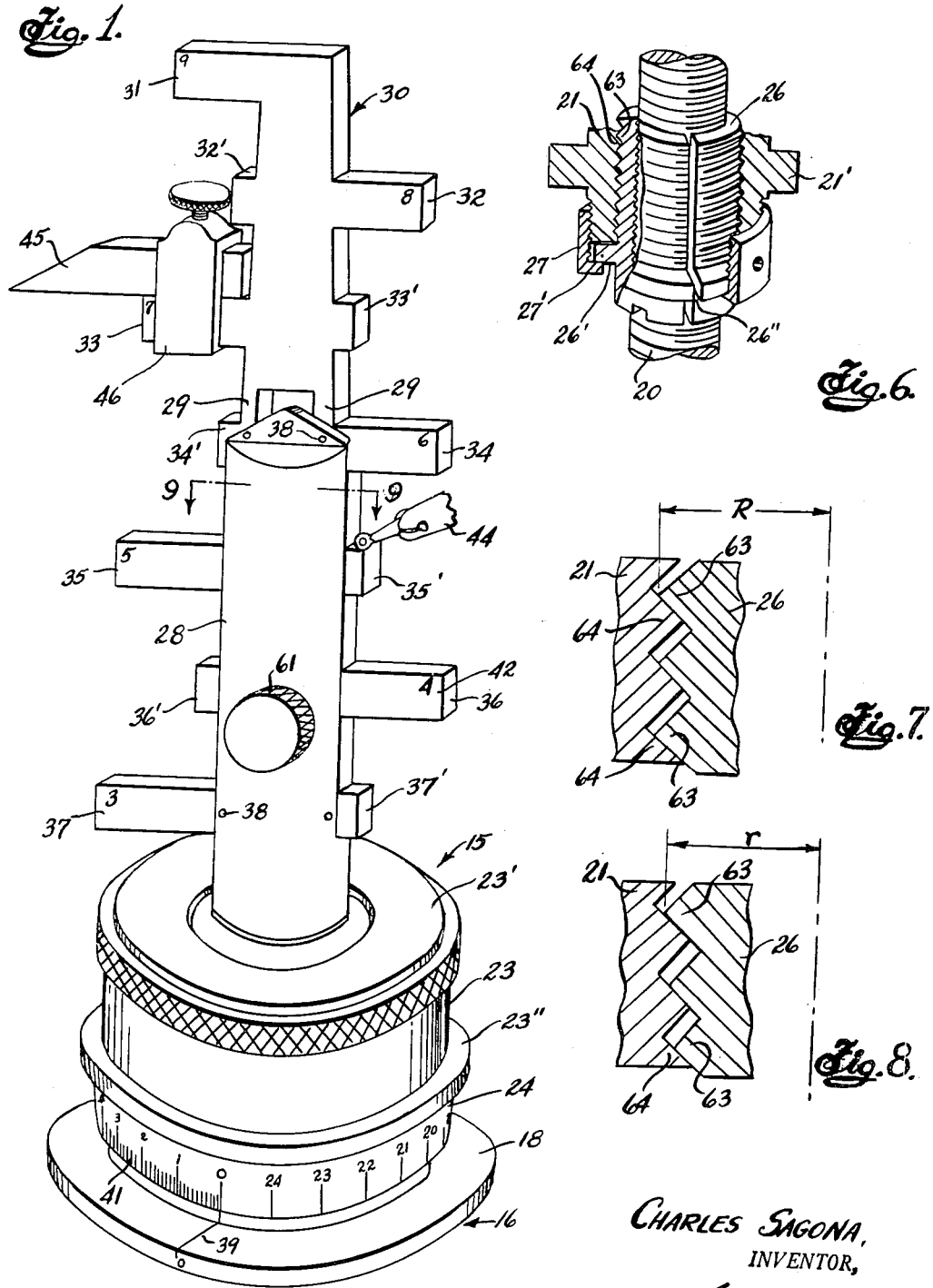
CHARLES SAGONA, INVENTOR,
BY-
ATTORNEY

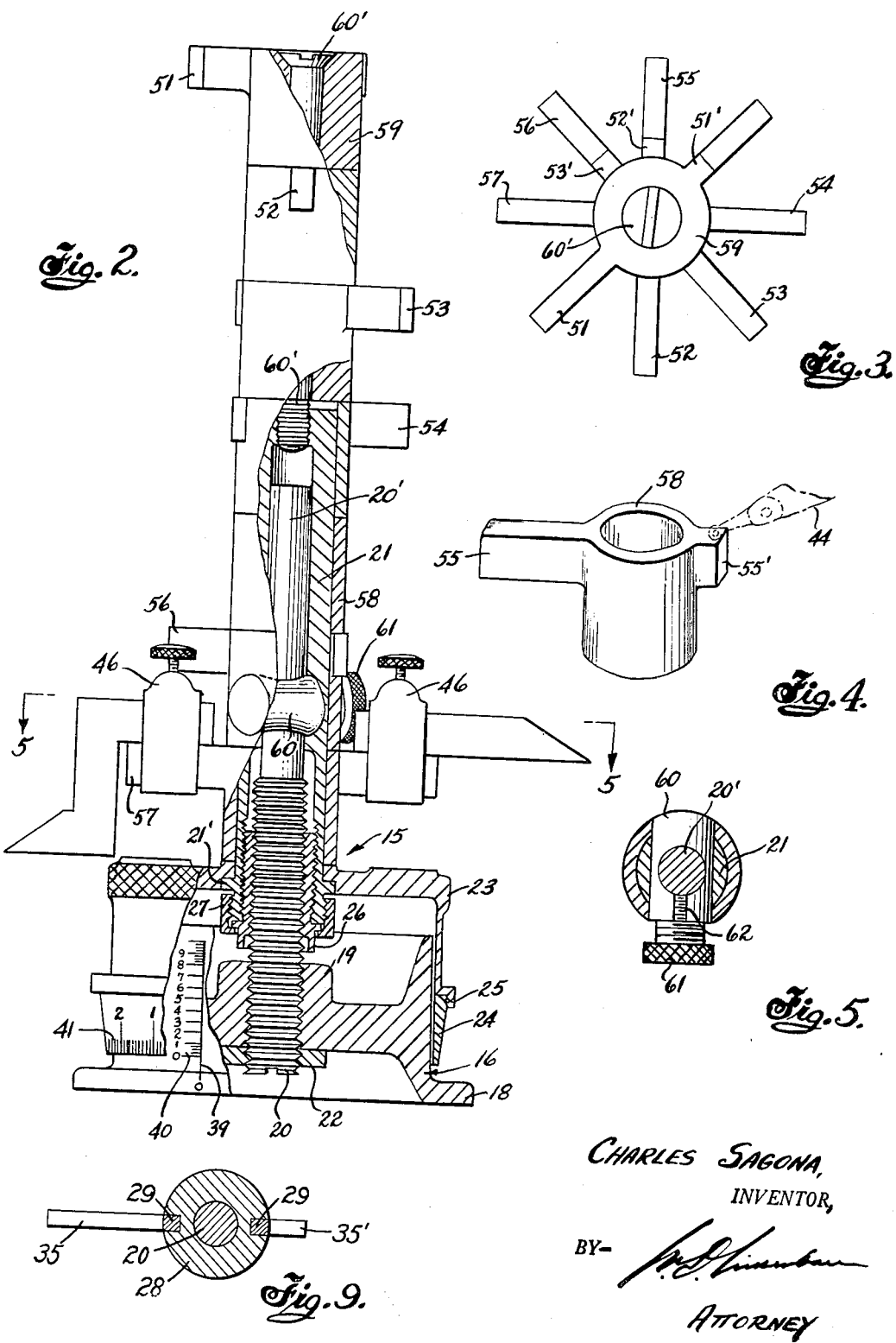

United States Patent Office 2,752,688
Patented July 3, 1956

2,752,688
MULTI-PURPOSE HEIGHT GAGES
Charles Sagona, Brooklyn, N. Y.
Application May 7, 1953, Serial No. 353,468
4 Claims. (Cl. 33—170)

The present invention relates to a multiple scriber height gage adaptable for many measuring uses by toolmakers, machinists and in quality production control. This new and improved gage device is of the micrometer type which is stood and moved on a true surface.

This device includes a micrometer structure having a fixed screw extending upwardly vertically from a base and a post concentrically positioned on said screw and riding therealong. Said post carries a plurality of radially extending fingers in a predetermined spaced relation therealong. Locking means is provided to hold the post at any set position along the screw. The mentioned fingers have other uses besides having scribers mounted on them. Other features and structure will be set forth in the more detailed description which is given later on in this specification.

An object of this invention is to provide a novel and improved gage device of the character mentioned, for selectively offering a plurality of scribers set in a predetermined relation so that each scriber can be worked with without hindrance from the others.

Another object is to provide a novel and improved gage device of the type described, affording means to hold said post on the screw without play or wobble and to eliminate any play which might result due to normal use of the instrument.

A further object of this invention is to provide a gage device of novel and improved construction and of the type mentioned, affording the maintenance of a desired micrometer setting by use of a locking means which in no manner effects the precise alignment of the mentioned screw and post.

Another object hereof is to provide a novel and improved gage device of the character described, affording means to correct the zero reading of the micrometer mechanism.

Another object hereof is to provide a novel and improved height gage device of the kind set forth, which permits readings at a plurality of precisely spaced points, without hindrance from any scribers mounted on the mentioned finger members.

A further object of this invention is to provide in a gage device of the sort set forth, novel and improved constructions whereby distances between fingers may be changed and whereby finger structures may be provided which permit their angular relation to be changed.

Still a further object hereof is to provide a high precision gage device of the type mentioned, which is light weight, unobstructed by framework, reasonably cheap to manufacture, easy to adjust and use, and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a perspective view of a gage device embodying the teachings of this invention.

Fig. 2 is an elevational view of a gage device of modified construction, shown partly in section.

Fig. 3 is a top view of Fig. 2, showing only the finger members.

Fig. 4 is a perspective view of one of the finger members included in the device illustrated in Fig. 2.

Fig. 5 is a section taken at line 5—5 in Fig. 2.

Fig. 6 is a fragmentary perspective sectional view in part of the screw and post alignment means of the micrometer mechanism, which latter is the same in both embodiments shown.

Figs. 7 and 8 are representations of engaging screw threads of various of the components herein and will be used to explain how wobble or play is eliminated, as taught by this invention.

Fig. 9 is a section taken at lines 9—9 in Fig. 1.

In the drawings, the micrometer mechanism designated generally by the numeral 15, comprises a wheel-like structure 16 which serves as a base. This wheel-like piece 16 lies horizontal, has an outward flange 18 which is the foot of such base and through a threaded bore in its hub 19, is concentrically mounted the vertically upward screw 20 which is locked by means of the nut 22. The upward portion of said screw is a smooth circular shank 20' about which rotatably fits the vertical hollow post 21 which is a tubular member having an outward flange 21' spaced from its bottom end, on which flange is pinned concentrically the inverted cup member 23 which is revolvable about the periphery of the member 16, most of which it contains. The rim of cup member 23 is enlarged to provide a seat for the ring member 24 which depends therefrom around the wheel-like piece 16. In opposite grooves, there is a spring wire 25 holding said ring member 24 in frictional engagement with the cup member 23. There is slight clearance between the inner walls of both the cup member 23 and the ring 24, and the periphery of the base member 16. The lower portion of the bore through the tubular post 21, is of enlarged diameter to be clear of the screw threads of screw member 20. The lower portion of said post is internally threaded to hold the internally and externally threaded split nut or bushing 26; the interior threads of said bushing being threadedly engaged with the screw 20. This bushing, near the bottom thereof, is provided with an outward flange 26' which rests against the bottom end of the tubular post 21. An internally threaded lock nut or ferrule 27, threadedly engaged on the bottom of said post, and with its inward flange 27' against the underside of the flange 26'. There is clearance between the ferrule 27 and the post's flange 21'. It is evident that the said post 21 is secured to the bushing 26, and with it rides along the screw 20, upon rotation of said post relative to the base 16.

The micrometer mechanism is alike in both embodiments of the gage device illustrated in the Figs. 1 and 2 respectively, except that the tubular post in Fig. 1 (akin to post 21 in Fig. 2) denoted by the numeral 28, has opposite slots therethrough in a diametral plane, for mounting the downward tines 29 of a member 30 cut from plate stock and formed with the horizontal, comparatively long fingers numbered 31 through 37 and their related surface-aligned teats indicated by their numbers primed. Said fingered member 30 is secured to the post 28 by rivets 38 for instance.

The top surfaces of said fingers which are at different levels and the surfaces 23' and 23" are preferably exactly one inch apart, since the scope of measurement of the micrometer device 15 in the illustrated embodiments, is shown to be one inch. When the micrometer reads zero, the bottom surface of the base 16 and the surface 23' shall be two inches apart preferably.

As is usual in micrometer constructions, the screw 20 has forty threads to the inch. The periphery of the base member 16, or barrel as it may be designated, carries the usual scale 40 parallel to the screw axis, in which scale the inch is divided into ten equal parts and each such part into four, while the periphery of the ring 24 of cup member 23, commonly called the thimble of a micrometer mechanism, has a peripheral scale 41 thereon, divided into twenty-five parts and these into ten parts each. With such system of graduations, readings on the thimble are in one-ten thousandths of an inch.

The dimensions of the parts of this device are so chosen that by the adjustment afforded by movement of the screw 20, the distance between the bottom surface of 16 and the top surface 23' of the thimble 23, can be made two inches precisely. Therefore, to set the micrometer mechanism to read zero, such required adjustment of the screw 20 is made with the aid of an outside measuring means, and the ring member 24 is rotated on the thimble 23 until the zero graduation on scale 41 coincides with the zero line 43 on the barrel 16. The frictional hold of the flexed spring ring 25, of course, maintains said ring against slippage on the thimble 23. During use, correction to true zero is easily effected by merely setting this ring member to true zero as mentioned. Any wobble or looseness occurring between the screw 20 and the post member 21 of the thimble structure, is taken care of by means as will be explained.

General use of the devices shown as height gages, is evident to those versed in the machinist's art and the adaptability and usefulness of the unobstructed teats as shown at 35' where 44 is an indicator instrument on some outside fixture, can be readily appreciated by the toolmaker and lay-out man, especially when the fingers of the type 33 have scribers 45 held thereon by clamps such as 46. Though the finger 33 is thus disposed where it cannot be used to take readings as for instance by an indicator 44, yet its companion teat 33' is available for such purpose. It may be noted that it is advisable to mark each finger with a numeral indicating its height in inches as at 42 in Fig. 1, so that the actual height reading is such numeral plus the readings on scales 40, 41 of the micrometer mechanism. Also, the common zero line of scale 40 may be extended across the top and side surfaces of the flange 18, as shown at 39, to facilitate observing the micrometer reading.

While all the fingers 31—37 in the device of Fig. 1, are integral parts of member 30, the fingers 51—55 in the embodiment shown in Fig. 2, are separate and can be set in any required or convenient angular relation to each other around the axis line of the post 21. Each finger as 55 and its companion teat 55', extend radially from a collar 58 or hub 59, suited to be mounted on the post 21 as shown. The numeral 60' denotes a screw for those parts which are mounted atop the post 21. This mode of construction permits the collars as 58 and the hubs as 59, to be made of predetermined heights, identical or different as the uses to which the gage is to be put, dictate.

There is associated with the micrometer mechanism 15, a means to lock the post 21 (or 28) to the screw 20, in order to have a fixed gage at any desired setting. Such locking means comprises a piece of rod 60 having a hole therethrough intermediate its ends so that said rod piece fits slidingly on the smooth shank part 20' of the micrometer screw 20. This rod piece is first set in opposite holes through the walls of the post 21, then for assembly, said screw shank 20' is set through the hole in such rod piece 60. In one end of this piece, there is a threaded hole communicating with the hole through which the screw shank is positioned, for the set screw 61, and there also is a slit 62 lengthwise in the threaded wall of said piece. A no-play locking action maintaining any micrometer setting, is effected by this structure shown in Fig. 5, because upon advancement of the screw 61 in the split-nut called piece 60, after shank 20' is gripped between them, said split nut will be slightly sprung, thereby offering a force component which acts to further press said screw 61 against the shank 20' whereby a very firm hold is accomplished on the micrometer screw 20 and all play in the setting of the barrel 16 and the thimble 23, is made nil.

As a means to eliminate any play or wobble between the screw 20 and the post 21, I have provided the split bushing 26 and its ferrule lock-nut 27 which are accessible for manipulation upon removal of the nut 22 and the barrel 16 from off the screw 20. Said bushing 26 is internally threaded for said screw 20 and externally threaded to fit into the lower end of the tubular post 21 until stopped by the outer flange 26' which is part of said bushing. The ferrule lock-nut 27 is threadedly engaged on the lower end of said post 21 and the inward flange 27' of such ferrule sets against the underside of said bushing's flange 26', thereby locking said bushing against movement along the post 21.

When such bushing is free for any such movement, there is some minute play between the exterior threads 63 of said bushing and the threads 64 which they engage of the post 21, and likewise between the interior threads of said bushing and those of the screw 20 engaged by the latter. But upon turning said bushing into the post so that its flange 26' is very tightly against the bottom end of said post, then due to the resilience of said bushing afforded by the longitudinal slot 26", the threads 63 will slide a little radially inwardly and set into good frictional engagement with the threads 64, and the diameter of said bushing will become reduced slightly from $2R$ to $2r$, thereby producing a no-play precise fit between the members 20, 26 and 21.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

I claim:

1. In a gage device, a frame piece, a screw extending therefrom, a nut threadedly engaged on the screw; said nut being split and open lengthwise, an elongated member having a lengthwise bore therein which is open at least at one end of said member; the entrance of said bore being threaded and said nut being externally threaded and threadedly engaged in said threaded entrance of said bore; said nut having a flange in contact with the end of said member at which said bore opens whereby tightening said nut into said member, will cause the split of said nut to close; said screw lying part into said bore, releasable means on said member, engaging the flange on the nut in order to secure said nut against movement on said member and cooperative means on said frame piece and the mentioned member for indicating the distance said member moves along the screw; said nut being of a material having some resilient quality.

2. The gage device as defined in claim 1, including an externally threaded portion on the end of the mentioned member where the entrance to the bore is, and wherein the means for securing the nut to said member is an internally threaded ferrule in threaded engagement on said externally threaded end portion of said member; the flange of said ferrule being in contact with the flange on said nut; said flange on the nut being between and in contact with the flange of said ferrule and the said member.

3. In a gage device, a frame piece, a screw extending therefrom, an elongated member having a lengthwise bore therein which is open at least at one end of said member, nut means in said bore carried along with said member; said screw being threadedly engaged in said nut means and lying partly in said bore beyond said nut means; said member having another bore therein from the surface thereof; said bores being in angular relation and communicative, a rod piece positioned in the second bore and having a bore therein in alignment with the first mentioned bore in said elongated member; the screw extending through the bore in said rod piece; said rod piece having a threaded axial bore therein commencing at the exposed end of said rod piece; the wall of said threaded bore being split and open lengthwise and a set-screw threadedly engaged in the said threaded bore in the rod piece adapted to be moved to bind the screw against the said rod piece; said rod piece being of a material having some resilient quality.

4. The gage device as defined in claim 3, wherein the first mentioned screw is slidably fitted in the bore through the rod piece and said rod piece is slidably fitted in the second mentioned bore in the elongated member.

References Cited in the file of this patent

UNITED STATES PATENTS

| | | |
|---|---|---|
| 729,970 | Spalding | June 2, 1903 |
| 1,216,680 | Fransosi | Feb. 20, 1917 |
| 1,252,009 | Jaques | Jan. 1, 1918 |
| 2,544,004 | Bauer | Mar. 6, 1951 |
| 2,650,436 | Gessler | Sept. 1, 1953 |
| 2,713,208 | Bizzocco et al. | July 19, 1955 |

FOREIGN PATENTS

| | | |
|---|---|---|
| 125,908 | Sweden | Aug. 1949 |